United States Patent [19]

Gullman

[11] Patent Number: 4,563,088

[45] Date of Patent: Jan. 7, 1986

[54] DEVICE FOR MAINTAINING A MOVING CURVED SURFACE A CONSTANT DISTANCE FROM A STATIONARY POINT

[75] Inventor: Larry S. Gullman, Pittsboro, Ind.

[73] Assignee: RCA Corporation, Princeton, N.J.

[21] Appl. No.: 466,594

[22] Filed: Feb. 15, 1983

[51] Int. Cl.[4] ........................................... G01N 21/01
[52] U.S. Cl. .................................... 356/244; 356/239
[58] Field of Search ................ 356/244, 239; 250/562, 250/563, 572, 224; 350/529, 531, 532

[56] References Cited

U.S. PATENT DOCUMENTS

| | | | |
|---|---|---|---|
| 2,708,857 | 5/1955 | Golding | 356/239 |
| 2,991,686 | 7/1961 | Boicey | 356/239 |
| 3,395,628 | 8/1968 | Kautz et al. | 95/1 |
| 3,620,627 | 11/1971 | Davies | 356/244 X |
| 3,848,983 | 11/1974 | Fridrich | 95/1 |
| 4,076,426 | 2/1978 | Gross et al. | 356/239 |
| 4,267,204 | 5/1981 | Tomita et al. | 427/68 |

Primary Examiner—Davis L. Willis
Assistant Examiner—Matthew W. Koren
Attorney, Agent, or Firm—D. H. Irlbeck; L. L. Hallacher; T. H. Magee

[57] ABSTRACT

A device for maintaining a moveable faceplate panel a constant distance from a stationary point includes a fixed caddy. The caddy has longitudinally parallel fixed rails which curve in the same direction as one curvature of the panel. A moveable caddy rides on the fixed rails and includes additional rails which curve in the same direction as the other curvature of the panel. A panel carrier rides on the additional rails whereby the surface of the panel remains the constant distance from the stationary point and as movement occurs along either or both sets of rails.

20 Claims, 3 Drawing Figures

DEVICE FOR MAINTAINING A MOVING CURVED SURFACE A CONSTANT DISTANCE FROM A STATIONARY POINT

BACKGROUND OF THE INVENTION

This invention relates generally to a device for maintaining a moving curved surface a constant distance from a stationary point and particularly to a device for moving a kinescope faceplate panel over a detector or light source while maintaining a constant spacing between the panel and the detector or light source.

During the production of picture tubes for color television sets, a black matrix is applied to the inside surface of the faceplate panels. The black matrix consists of parallel black lines which extend vertically as defined by the viewing orientation of the tube. The black lines are spaced at desired intervals leaving transparent glass in the spaces between the matrix lines. The transparent spaces are coated with slurries of materials containing phosphors which emit the three primary colors of red, green, and blue light when impacted by electrons. The three colors of phosphors are alternately applied in a repetitive sequence, such as red, green and blue to all the transparent spaces of the panel. Prior to the application of the phosphors it is desirable to measure the transparent spacings and the matrix line widths to verifty that they are within acceptable dimensional tolerances in order to avoid the expensive application of phosphors to improperly matrixed faceplates.

A system for measuring the width of the transparent spaces, and the combined width of the spaces and black matrix lines is described in Application Ser. No. 466,595 entitled "SYSTEM FOR MEASURING LINE SPACINGS ON A CURVED SURFACE" filed on even date herewith by Frank S. Krufka, now U.S. Pat. No. 4,525,735. In the Krufka system, the faceplate panel is moved with respect to a stationary light source which emits light through the faceplate panel to a detector. The detector provides an output signal which varies from high to low in accordance with the light transmission of the spaces and light opaque nature of the matrix lines on the panel. The matrix bearing surface of the panel is curved, and the light source and detector are stationary with respect to the panel. Accordingly, the distance from the light source to the panel will vary if the panel motion occurs in a plane which is perpendicular to the light path between the source and the detector. There, therefore, is a need for a device for maintaining a constant spacing between a curved surface and a stationary point as the curved surface moves with respect to the point. The instant invention is directed to a device which fulfills this need.

SUMMARY OF THE INVENTION

A novel device maintains a curved surface a substantially constant distance from a stationary point as the surface moves relative to the point. The curved surface can have a first curvature along a first axis and a second curvature along a second axis normal to the first axis. The device includes a fixed caddy means arranged at a particular position with respect to the stationary point. The caddy includes fixed curved rails extending parallel to the first axis. The curvature of the rails is similar to and in the same direction as the first curvature of the surface. A moveable caddy means receives and positions the curved surface the constant distance from the stationary point. The moveable caddy means is moveably supported by the rails whereby the curved surface remains the constant distance from the point as the moveable caddy moves on the rails.

DETAILED DESCRIPTION OF THE PREFERRED EMBODIMENT

Figure 1:
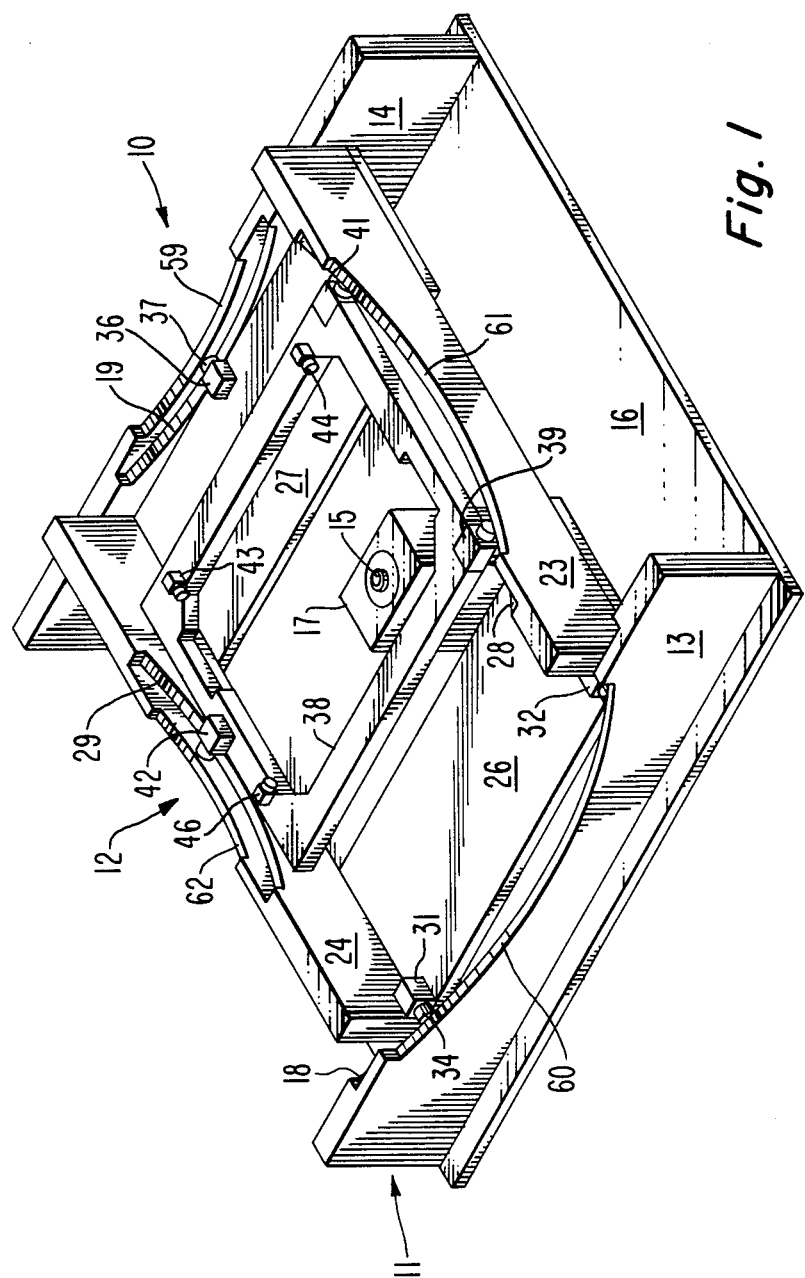
FIG. 1 is an isometric view of a preferred embodiment.

In FIG. 1, a device 10 for maintaining a curved surface a substantially constant distance from a stationary point 15, includes a fixed caddy means 11 and a moveable caddy means 12. The fixed caddy means 11 includes side members 13 and 14 which are fixedly connected by a rigid base member 16. Light from a source 20 (FIG. 2) is received by a detector 17 located at the stationary point 15. The positions of the source 20 and the detector 17 can be reversed. Curved edges, or rails, 18 and 19 are formed in the side members 13 and 14, respectively.

As is known to those skilled in the art, the surface of a color television picture tube is substantially rectangular with the major axis extending in the horizontal direction and the minor axis extending in the vertical direction when the picture tube is orientated in the viewed position. The interior surface of the typical faceplate is curved in both the horizontal and vertical directions and typically the radii of curvatures are different along the two axes. The rails 18 and 19 are formed to curve in the same manner as the curve along one of the axes of the panel, for example, the horizontal axis. In the embodiment shown in FIG. 1, the rails 18 and 19 curve downwardly toward the base member 16. Accordingly, the faceplate panel 21 (FIG. 2), the matrix spaces of which are to be measured, is supported in the device 10 with the curved surface of the panel facing downwardly the same as the curves of the rails 18 and 19. Alternatively, the panel 21 could be placed in the device 10 with the curved surface facing upwardly away from the base 16, and in this instance, the rails 18 and 19 would also face upwardly away from the base 16.

Figure 2:
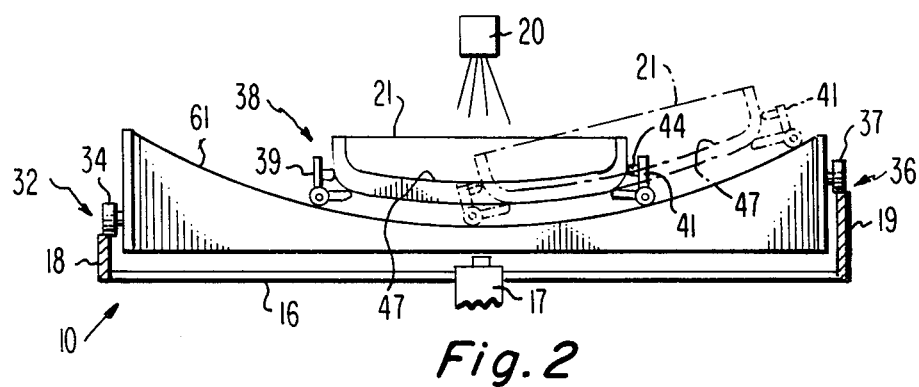
FIG. 2 is a simplified side view of the preferred embodiment showing the maintainance of a substantially constant distance between a fixed element and a curved surface during movement of the surface with respect to the element.

The moveable caddy means 12 includes two sides 23 and 24 which are fixedly coupled by rigid members 26 and 27. The sides 23 and 24, respectively, include curved edges, or rails, 28 and 29 which curve in the same manner as the curve along the other axis of the faceplate panel 21, for example the vertical axis when the horizontal axis is parallel to the rails 18 and 19. The rigid members 26 and 27 maintain the sides 23 and 24 in a fixed parallel relationship so that the rails 28 and 29 are parallel to one another and perpendicular to the rails 18 and 19. A pair of followers 31 and 32 is affixed to and spaced along the rigid member 26 to support one side of the moveable caddy means 12 on the rail 18. As shown in FIG. 2, the follower 32 includes a roller 34 which rolls along the rail 18 to move the panel 21. The rigid member 27 supports an additional follower 36 at a position substantially equally spaced from the sides 23 and 24. The follower 36 includes a roller 37 which rolls along the rail 19 and which supports the other side of the moveable caddy 12 on the rail 19. The use of the two followers 31 and 32 to support one side of the moveable caddy 12 and a single follower to support the other side of the caddy 12 results in the moveable caddy having a 3-point support which has improved stability over a 4-point support system. The moveable caddy 12 moves along the rails 18 and 19 and, therefore, the configurations of the rails 18 and 19 must be related to the configuration of the curve along one axis of the panel 21. However, because of the 3-point support, both the cordal extent of the rail curves, as measured along the top of the sides 13 and 14, and the spacing between the base 16 and the lowest point on the curves must be different. This is explained hereinafter with reference to FIG. 3.

The moveable caddy means 12 also includes a moveable carrier 38 one side of which supports two followers 39 and 41 to moveably support one side of the carrier 38 on the rail 28. The other side of the moveable carrier 38 supports an additional follower 42 to moveably support the other side of the carrier 38 on the rail 29. Accordingly, the three followers 39, 41 and 42 provide a 3-point support to the carrier 38 in the moveable caddy 12. Accordingly because of the use of 3-point support of the carrier 38 in the caddy 12 the cordal extent of the curved rails 28 and 29 and the lowest point on the rails are different.

A plurality of panel guides 43, 44 and 46 are permanently affixed to the carrier 38 and insure that the horizontal and vertical axes of the faceplate panel 21 are parallel to the rails 18 and 19, and 28 and 29, respectively. The detector 17, or the light source 20, is arranged at the fixed point 15 and preferably is located at the center of device 10. The faceplate panel 21 (FIG. 2) is placed onto the moveable carrier 38 and the horizontal and vertical axes are aligned parallel to the rails 18, 19 and 28, 29 by the guides 43, 44 and 46. Motion of the moveable caddy 12 along the rails 18 and 19 effects motion of the panel 21, with respect to the detector 17 in a direction parallel to the horizontal axis of the panel. Because the rails 18 and 19 curve in the same direction as the horizontal axis of the faceplate panel, and because the curvatures of the rails and panel are related in a manner described with respect to FIG. 3, the spacing between the fixed point 15 and the faceplate 21 surface remains substantially constant. Similarly, because the rails 28 and 29 curve in the same direction as the vertical axis of the faceplate panel during motion of the carrier 38 along the rails 28 and 29 the spacing between the faceplate panel 21 and the detector 17 remains substantially constant.

Motion of the moveable carrier 38 and the moveable caddy means 12 can be effected by the use of lead screws and stepping motors, not shown, so that any desired extent of motion can be effected with a high degree of accuracy. Additionally, the use of the lead screws and stepping motors allows either the moveable caddy 12 or the carrier 38 to be stopped and held in a position which is nonlevel with respect to the fixed caddy 11.

FIG. 2 is a simplified showing of the device 10 to more clearly illustrate the motion of the moveable carrier 38 within the device 10. The carrier 38 is supported along the curved rail 28 by the followers 39 and 41. The faceplate panel 21 is carried by the carrier 38 and has been aligned with the horizontal and vertical axes of the device 10 by the guides 43, 44 and 46. The rollers 34 and 37 of the followers 32 and 36 are positioned on the curved rails 18 and 19 respectively. The rails 18 and 19 are shown in cross-section to illustrate the difference in height required because of the 3-point support of the caddy 12.

As shown by the phantom line position in FIG. 2, the panel 21 can be moved in a direction parallel to the vertical axis of the panel while maintaining a constant spacing between the detector 17 and the panel 21. Similarly, because the rails 18 and 19 and the horizontal axis of the panel 21 curve in the same direction, motion in the horizontal direction can be effected by moving the moveable caddy 12 along the rails 18 and 19 while maintaining a substantially constant spacing between the detector 17 and the surface of the faceplate panel 21. Accordingly, motion along either one or both the horizontal or vertical axes of the panel 21 can be effected while maintaining a substantially constant spacing between the detector 17 and the surface 47 of the panel 21. As the panel 21 moves over the detector 17, the transparent spaces and opaque matrix lines on the panel surface alternately pass and inhibit light from the light source 20 which is stationarily arranged above the panel 21. The output signal of the detector 17 thus varies between high and low and these variations are used to measure the spacing and matrix line widths in a manner fully disclosed in U.S. application Ser. No. 78,166 fully referenced hereinabove.

Figure 3:
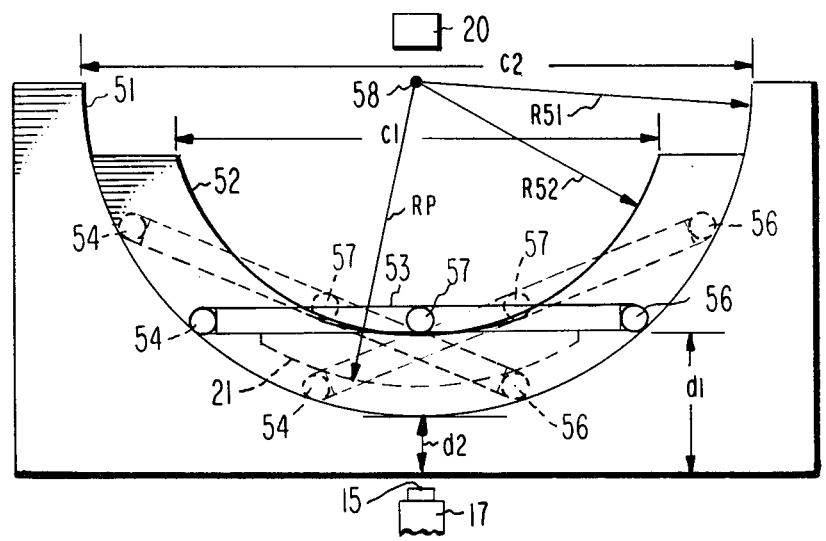
FIG. 3 shows the differences in the cordal extent and positioning in the rails when a 3-point support is used.

FIG. 3 shows how the 3-point support of the caddy 12 and the carrier 38 causes the curved rails 18 and 19 or 28 and 29 to have different cordal extents and displacements from the baseplate 16. Two curves 51 and 52 simulate either the rails 18 and 19, or the rails 28 and 29 in FIG. 1. A rigid member 53 spans the curve 51, and includes followers 54 and 56 at the extremities. An additional follower 57 is centered in the member 53 and follows the curve 52. The rigid member 53 simulates the moveable caddy 12 or the carrier 38, the followers 54 and 56 simulate the followers 31 and 32 or 39 and 41, and the follower 57 simulates the follower 36 or 42. When the rigid member 53 is level with respect to the base member 16, the follower 57 is located at the lowest point on the curve 52. Accordingly, the displacement $d_1$ of the lowest point on the curve 52 exceeds the displacement $d_2$ of the lowest point on the curve 51. Additionally, the cordal extent $C_1$ across the curve 52 is less than the cordal extent $C_2$ across the curve 51. Because of these differences in the curves 51 and 52, the followers 54 and 56 move along the curve 51 and the follower 57 moves along the curve 52 as the rigid member 53 moves from the level position to any other position, such as the two positions shown in phantom.

When the curvature of the panel 21 along the axis being measured is circular, the curves 51 and 52 also are circular. In FIG. 3, the panel 21 has a radius Rp and the curves 51 and 52 have different radii R51 and R52 respectively. The radii Rp, R51 and R52 originate from the same origin 58 and all points on each particular curve are equidistant from the origin 58. Accordingly, the distance between the origin 58 and any point on the panel 21 is different from the distance between the origin 58 and any point on the curve 51 irrespective of the position of the member 53 on the curve 52. For this reason, the fixed caddy 11, the moveable caddy 12, and the moveable carrier 38 are constructed and dimensioned so that the radii of curvature of all the curved rails and the panel 21 have the same origin when the panel is placed in the carrier 38.

The configuration of either or both axes of the panel surface 47 can be something other than circular. In such an instance, the curvatures of the axes are defined by the derivative:

$$K = d\phi/ds$$

where:
K = the curvature
$\phi$ = the angle of the tangent to the curve
s = the area length along the curve With this definition of curvature, the radii of curvature of the curved rails can be selected relative to those of the curved surface and all points on the surface maintained a constant distance from the fixed point in the device as the surface moves relative to the fixed point.

In FIG. 1, a curved rail 60 is longitudinally parallel to the rail 18 in the side 13. Also, a curved rail 59 is longitudinally parallel to the rail 19 in the side 14. In a similar manner additional curved rails 61 and 62 are longitudinally parallel to the rails 28 and 29 respectively. The rails 59 and 60 have curves in accordance with the curve along one axis of a faceplate panel different in size from the size of the panel used with the rails 18 and 19. The rails 61 and 62 have a curve in accordance with the curve along the other axis of the different size panel. Accordingly, different sizes of panels can be kept a constant distance from the detector 17 simply by using the different sets of rails. The additional rails 59, 60, 61 and 62 and the surface curvatures of the different size panels have the same origin, which can be different from the origin 58. Similarly, additional sets of rails can be added to the device 10 to accommodate additional sizes of panels.

What is claimed is:

1. A device for maintaining a curved surface a substantially constant distance from a stationary point as said surface moves relative to said point, said curved surface having first and second curved axes, said device comprising:
fixed caddy means arranged at a particular position with respect to said stationary point, said fixed caddy means including fixed rails extending parallel to and curving in the same direction as said first curved axis; and
moveable caddy means for positioning said curved surface said constant distance from said point, said moveable caddy means being moveably supported by said fixed rails and including carrier means for receiving said curved surface, said moveable caddy means including second rails extending parallel to and curving in the same direction as said second curved axis, whereby said curved surface substantially remains said constant distance from said stationary point as said curved surface moves along either of said axes.

2. The device of claim 1 wherein said fixed caddy means has at least two substantially parallel fixed rails arranged on opposite sides of said stationary point, and said moveable caddy means has at least two substantially parallel rails arranged substantially normal to said fixed rails and on opposite sides of said fixed point.

3. The device of claim 2 wherein the curvatures of said axes and the curvatures of said rails are circular and have the same origin.

4. The device of claim 3 wherein said carrier means includes means for aligning the axes of said surface with said first and second axes.

5. The device of claim 2 wherein said rails of said moveable caddy means are coupled by substantially rigid members arranged substantially parallel to said fixed rails, one of said rigid members carrying a plurality of spaced followers for moveably supporting one side of said moveable caddy on one of said fixed rails, the other of said rigid members carrying at least one other follower for moveably supporting the other side of said moveable caddy on the other of said fixed rails, the curves of said fixed rails having different cordal extents whereby said curved surface substantially remains said constant distance from said stationary point as said followers move along said rails.

6. The device of claim 5 wherein one side of said carrier means carries a plurality of spaced followers for moveably supporting said one side on one of said second rails, another side of said carrier means carries at least one other follower for moveably supporting said another side on the other of said second rails, the curves of said second rails having different cordal extent whereby said curved surface substantially remains said constant distance from said stationary point as said followers move along said second rails.

7. The device of claim 5 wherein said carrier means includes means for aligning the axes of said surface with said first and second axes.

8. The device of claim 2 wherein one side of said carrier means carries a plurality of spaced followers for moveably supporting said one side on one of said second rails, another side of said carrier means carries at least one other follower for moveably supporting said another side on the other of said second rails, the curves of said second rails having different cordal extents whereby said curved surface substantially remains said constant distance from said stationary point as said followers move along said second rails.

9. The device of claim 8 wherein said first and second axes have different curvatures.

10. The device of claim 9 wherein the curvatures of said axes and the curvatures of said rails are circular and have the same origin.

11. The device of claim 9 wherein said fixed caddy means includes additional rails parallel to said fixed rails and having a curvature different from the curvature of one of said axes, and wherein said moveable caddy means includes more rails parallel to said second rails and having a curvature different from the curvature of the other of said axes whereby surfaces having different curvatures can be held a constant distance from said stationary point.

12. The device of claim 11 further including a detector arranged in the proximity of said stationary point and a light source arranged to transmit light to said detector through said surface.

13. The device of claim 12 wherein said curved surface is the faceplate of a kinescope.

14. The device of claim 2 wherein said axes and said rails curve toward said stationary point.

15. The device of claim 2 wherein said curved axis and said rails curve away from said stationary point.

16. The device of claim 15 wherein the curvatures of said axes are different.

17. The device of claim 16 wherein said fixed caddy means includes additional rails parallel to said fixed rails and having a curvature different from the curvature of one of said axes, and wherein said moveable caddy means includes more rails parallel to said second rails and having a curvature different from the curvature of the other of said axes whereby surfaces having different curvatures can be held a constant distance from said stationary point.

18. The device of claim 17 further including a detector arranged in the proximity of said stationary point and a light source arranged to transmit light to said detector through said surface.

19. The device of claim 18 wherein said curved surface is the faceplate of a kinescope.

20. The device of claim 2 wherein said carrier means includes means for aligning the axes of said surface with said first and second axes.

* * * * *